(12) United States Patent
Mezzino et al.

(10) Patent No.: US 11,852,171 B2
(45) Date of Patent: Dec. 26, 2023

(54) CONTROL MODULE FOR HYDRAULIC SYSTEM

(71) Applicant: Microtecnica S.r.l., Turin (IT)

(72) Inventors: Giacomo Mezzino, Turin (IT); Gianfranco Salvatoriello, Turin (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 17/882,968

(22) Filed: Aug. 8, 2022

(65) Prior Publication Data

US 2022/0372999 A1      Nov. 24, 2022

Related U.S. Application Data

(63) Continuation of application No. 17/152,980, filed on Jan. 20, 2021, now Pat. No. 11,408,446.

(30) Foreign Application Priority Data

Feb. 7, 2020     (EP) .................................... 20156255

(51) Int. Cl.
| | |
|---|---|
| *F15B 1/26* | (2006.01) |
| *F15B 13/02* | (2006.01) |
| *B64C 13/40* | (2006.01) |
| *B64C 25/22* | (2006.01) |
| *B64C 27/64* | (2006.01) |
| *F15B 13/08* | (2006.01) |

(52) U.S. Cl.
CPC .............. *F15B 13/02* (2013.01); *B64C 13/40* (2013.01); *B64C 25/22* (2013.01); *B64C 27/64* (2013.01); *F15B 1/26* (2013.01); *F15B 13/0814* (2013.01)

(58) Field of Classification Search
CPC .................................. F15B 1/26; F15B 13/02
See application file for complete search history.

(56) References Cited

U.S. PATENT DOCUMENTS

| | | |
|---|---|---|
| 2,396,864 A | 3/1946 | Logan |
| 2,546,565 A | 3/1951 | Schneider |
| 3,227,279 A | 1/1966 | Bokelman |
| 5,240,042 A | 8/1993 | Raymond |
| 10,443,436 B2 | 10/2019 | Miller et al. |

(Continued)

FOREIGN PATENT DOCUMENTS

DE          3833912 A      4/1990

OTHER PUBLICATIONS

Abstract of DE3833912A1, 1 page.
Extended European Search Report for International Application No. 20156255.0 dated Jun. 16, 2020, 7 pages.

*Primary Examiner* — Kenneth Bomberg
*Assistant Examiner* — Daniel S Collins
(74) *Attorney, Agent, or Firm* — CANTOR COLBURN LLP (57) ABSTRACT

There is provided a control module for a hydraulic system. The module comprises a tank and a plurality of valves. The tank is configured to store hydraulic fluid and is substantially cylindrical. The plurality of valves fluidly connect with the tank and are configured to control distribution of hydraulic fluid from the tank to one or more components of the system. The plurality of valves are spaced around a circumference of the tank. One or more passages fluidly connect the tank with at least one of the plurality of valves and/or a first of the plurality of valves with a second of the plurality of valves.

12 Claims, 6 Drawing Sheets

(56) References Cited

U.S. PATENT DOCUMENTS

| | | |
|---|---|---|
| 11,408,446 B2 * | 8/2022 | Mezzino ............... B64C 13/40 |
| 2017/0114667 A1 | 4/2017 | Sabo et al. |
| 2018/0309350 A1 | 10/2018 | Socheleau et al. |
| 2021/0246914 A1 | 8/2021 | Mezzino et al. |

* cited by examiner

Fig. 5

CONTROL MODULE FOR HYDRAULIC SYSTEM

CROSS-REFERENCE TO RELATED APPLICATIONS

This application is a continuation of U.S. application Ser. No. 17/152,980 filed Jan. 20, 2021 which claims priority to European Patent Application No. 20156255.0 filed Feb. 7, 2020, the entire contents of which is incorporated herein by reference.

FIELD

The present disclosure relates generally to a control module, sometimes termed a power control module, for a hydraulic system, and architecture associated therewith. Such control modules comprise a tank for holding hydraulic fluid, and a number of valves and passages for controlling distribution of hydraulic fluid to various parts of the system. Systems for use with such control modules can include aerospace applications, such as aircraft (e.g., aeroplane, helicopter, or other vehicle). The hydraulic fluid in such examples may be used to control (e.g., actuate) various components, such as landing gear, flight control surfaces, actuators for rotors such as the main rotor and/or tail rotor, and the like.

BACKGROUND

Figure 1A:
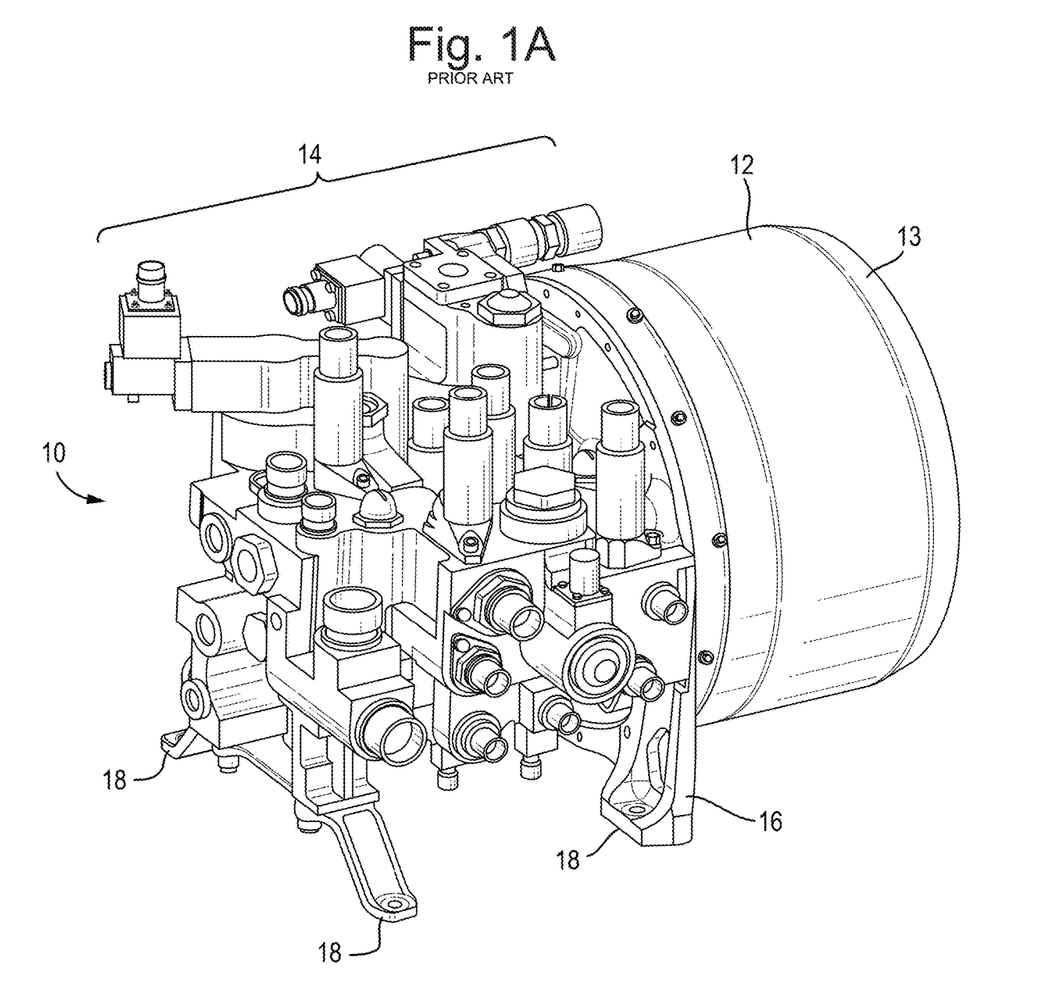
FIGS. 1A and 1B show a conventional control module for a hydraulic system, which comprises a tank for storing hydraulic fluid as well as a fluid manifold operatively connected to the tank.
Figure 1B:
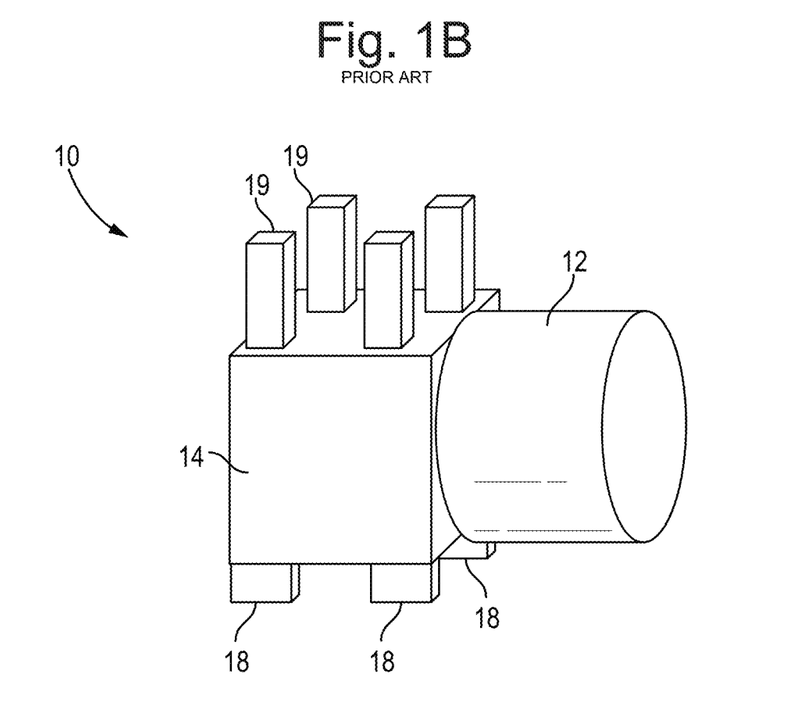

FIGS. 1A and 1B show a conventional control module 10 for a hydraulic system, which module 10 comprises a tank 12 for storing hydraulic fluid as well as a fluid manifold 14 operatively connected to the tank 12. The manifold 14 can include various fluid distribution features, such as valves, passages and the like for controlling distribution of hydraulic fluid to various parts of the system.

The tank 12 is mechanically linked to the manifold 14, although there is typically a physical separation between these components (e.g., by a spacer 16), whilst the feet 18 are typically located beneath the manifold 14 for connecting the module 10 to a suitable surface or component.

It has been found that asymmetrical loads may be experienced, for example if the module 10 is exposed to vibrations and other types of environments. There is also a need for a shield 13 surrounding the tank to ensure that the module 10 is fireproof.

FIG. 1B shows the module 10 more schematically, and including indication of the various input and output passages 19 for distribution of hydraulic fluid to and from the module 10. The hydraulic fluid is typically shielded from fire and other heat influences, and this can be through the use of a separate tank of fluid that surrounds a first tank.

It is desired to improve the construction of control modules such as that shown in FIGS. 1A and 1B to solve the above challenges.

SUMMARY

In accordance with an aspect of the disclosure there is provided a control module for a hydraulic system, the module comprising: a tank configured to store hydraulic fluid and being substantially cylindrical; a plurality of valves fluidly connected to the tank and configured to control distribution of hydraulic fluid from the tank to one or more components of the system, wherein the plurality of valves are located and/or spaced around a circumference of the tank; and one or more passages fluidly connecting the tank with at least one of the plurality of valves and/or a first of the plurality of valves with a second of the plurality of valves.

The above arrangement provides an improved control module that is more balanced due to the locating/spacing of the plurality of valves around a circumference of the tank. In refinements, the valves may be located between the axial ends of the tank (with respect to a longitudinal axis of the tank).

The one or more passages may extend at least partly in a circumferential direction around the circumference of the tank. This provides a better flow through the passages.

The control module may further comprise a plurality of feet (e.g., four feet) configured to attach the control module to a surface. Some (e.g., two) of the plurality of feet may be positioned at a first end of the control module, and others (e.g., two) of the plurality of feet may be positioned at a second end of the control module, wherein the first end may be opposite the second end. The 'end' referred to here may be defined by a or the longitudinal axis of the (cylindrical) tank. This provides a more balanced control module.

The plurality of feet may be positioned such that a centre of gravity of the control module is located between the feet when the control module is attached to a surface, e.g., a substantially horizontal surface. This balances the forces associated with the control module and reduces asymmetrical loads.

The plurality of feet may be positioned such that a centre of gravity of the control module is located substantially half-way along a length and width of the control module, when the control module is attached to a surface, wherein the length may be defined along a or the longitudinal axis of the (cylindrical) tank, and the width may be defined transverse to the longitudinal axis. This provides the optimum balancing of forces for the control module.

The control module may further comprise a housing, wherein at least some of the plurality of valves are formed by portions of the housing. This provides a lighter module with fewer parts. The one or more passages may be formed by and within the housing, which can help reduce weight.

The housing may comprise an inner cylindrical surface forming part of the tank. This can be combined with the passages being formed by and within the housing to provide a heat resistant structure using the fluid flow through the passages. This can avoid the need for an insulating piece around the tank, reducing weight and optimising the arrangement.

The housing may be a single/unitary piece, e.g., a single piece of material, and may be formed using an additive manufacturing process. Use of an additive manufacturing process is seen as an optimised and highly efficient way of constructing the module. It has been recognised that the use of valves around the circumference and (optionally) passages extending at least partly in a circumferential direction around the circumference of the tank can be easily manufactured using an additive manufacturing process.

The plurality of valves may comprise one or more supply valves configured to supply pressurised hydraulic fluid to one or more components of the hydraulic system.

The plurality of valves may comprise one or more return valves configured to receive hydraulic fluid from one or more components of the hydraulic system.

In accordance with an aspect of the disclosure there is provided a hydraulic system comprising a control module as described above.

The control module may be configured to supply pressurised hydraulic fluid to one or more components of the hydraulic system.

The hydraulic system may be for an aircraft, e.g., a helicopter. The components may be aircraft (e.g., helicopter) components, such that the control module is configured to supply pressurised hydraulic fluid so as to control and/or actuate the aircraft components.

The components may include one or more (or all of) a landing gear, one or more flight control surfaces, one or more actuators, such as actuators for rotors such as the main rotor and/or tail rotor of a helicopter.

BRIEF DESCRIPTION OF THE DRAWINGS

Various embodiments will now be described, by way of example only, and with reference to the accompanying drawings in which.

DETAILED DESCRIPTION

Herewith will be described various embodiments of a control module for a hydraulic system, sometimes termed a power control module (e.g., a hydraulic power control module). Such control modules comprise a tank for holding hydraulic fluid, and a number of valves and passages for controlling distribution of hydraulic fluid to various parts of the system. Systems for use with such control modules can include aerospace applications, such as aircraft (e.g., aeroplane, helicopter, or other vehicle). The hydraulic fluid in such examples may be used to control (e.g., actuate) various components, such as landing gear, flight control surfaces and the like.

In various embodiments the control modules of the present disclosure are configured for use with high stress environments, such as those used in aircraft, and also the control modules are configured to distribute hydraulic fluid to various different components. To do this the control modules may comprise any number of suitable valves and passages, wherein the valves may be moved or otherwise actuated by a control system to enable hydraulic fluid to control the components in question.

It has been found that additive manufacturing is particularly suitable for forming the control modules disclosed herein, in that various embodiments may require a complicated system of valves and passages that surround a hydraulic fluid tank. Additive manufacturing permits this complicated system to be manufactured more easily, especially due to the necessity in some embodiments of circumferential passageways between the various valves. This is discussed in more detail below.

Figure 2A:
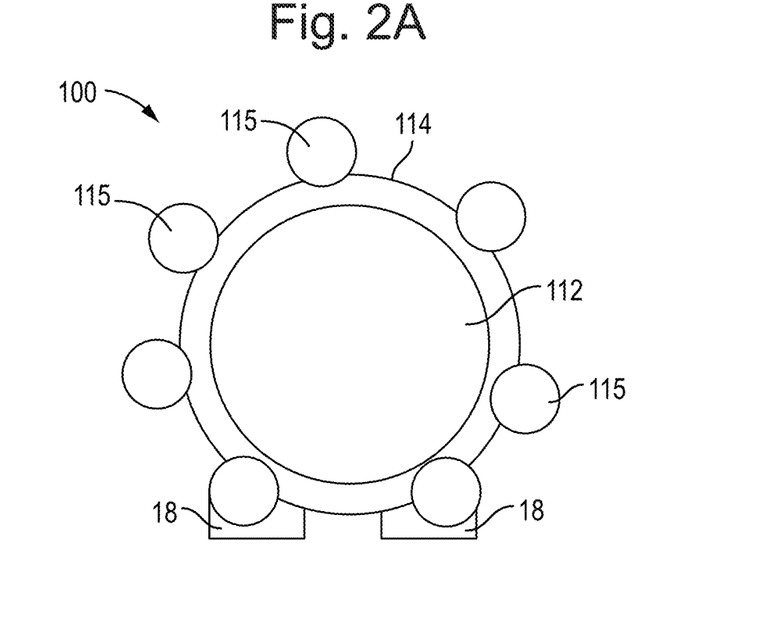
FIGS. 2A and 2B show a control module of the present disclosure, wherein the control module comprises a tank that is defined (e.g., formed) by a housing.
Figure 2B:
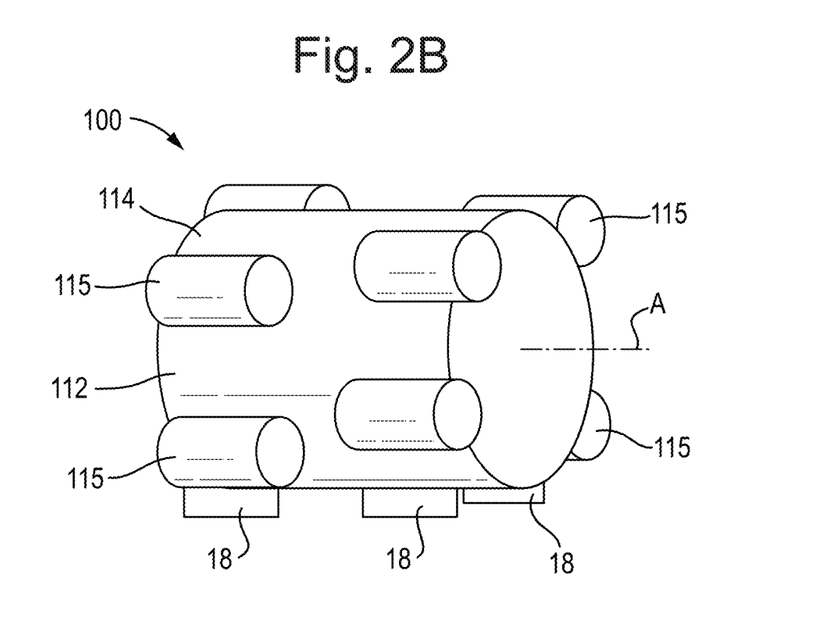

FIGS. 2A and 2B show schematically a control module 100 of the present disclosure, wherein the control module 100 comprises a tank 112 that is defined by a housing 114. The tank 112 is for storing hydraulic fluid, which can then be distributed to a hydraulic fluid system provided in connection with the control module 100.

The control module 100 is shown schematically in FIG. 2A, wherein a manifold for distributing hydraulic fluid is located circumferentially around the tank 112, and forms part of the housing 114. Various valves 115 may be located, for example, around a circumference of the tank 112, which form part of the manifold and are configured to distribute hydraulic fluid to the hydraulic fluid system.

As shown in more detail in FIG. 2B, the control module 100 comprises feet 118 that are distributed at each opposed end of the tank 112, wherein the feet 118 are for connecting and/or attaching the control module 100 to a suitable surface or component. Importantly, the centre of gravity of the control module 100 is located between the feet 118 and in the direction of a longitudinal axis A of the tank 112.

The control module 100 may be provided as an integrated, single piece, so as to provide an all-in-one architecture including the tank 112 and various components for distributing hydraulic fluid to a hydraulic fluid system, including the valves 115 and other passages fluidly connecting the valves 115 to the tank 112.

Due to the complicated nature of such a module 100, including circumferential passages between the valves 115, conventional manufacturing techniques may not be suitable for manufacturing the control module 100 as disclosed herein. As such, additive manufacturing techniques may be used that greatly simplify the manufacture of the control module 100 and provide this as a single piece as aforesaid.

It has been found that combining parts of the manifold for the distribution of hydraulic fluid from the tank 112 with the housing 114 means that there is hydraulic flow (e.g., continuous hydraulic flow) during use of the control module 100, which assists in heat dispersion and minimises the risk of overheating of the control module 100. This also eliminates the need for a fire shield located around the tank 112, as is required in conventional techniques described above, which reduces mass and the number of components required for the module.

In the module 100 of the present disclosure the fire protection capability previously provided by a second tank is now provided by the hydraulic ducts, valves, etc. that naturally surround the tank 112. In this way we can avoid the second tank (or similar solutions) of the conventional arrangement.

Figure 3:
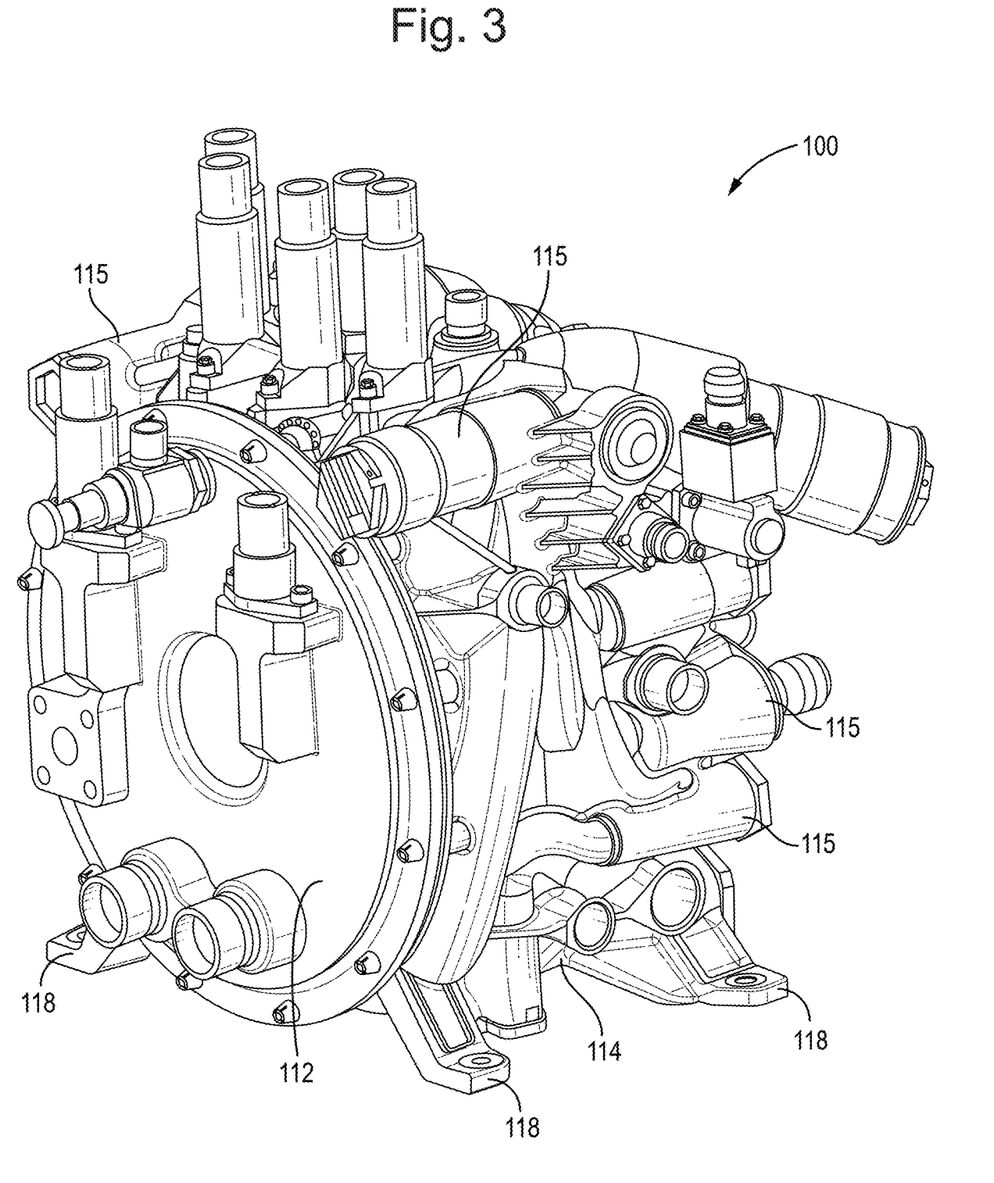
FIG. 3 shows a control module according to the disclosure in more detail, and including various valves that are distributed around a circumference of a hydraulic fluid tank.

FIG. 3 shows a control module 100 according to the disclosure in more detail, and including various valves 115 that are distributed around a circumference of a hydraulic fluid tank 112. The tank 112 is formed in part by a housing 114, wherein a manifold for distributing hydraulic fluid is formed by part of the housing 114.

Various fluid passages are provided between the valves 115, and these may include circumferential passages fluidly connecting the valves 115 and/or the tank 112. The use of circumferential passages is seen as beneficial, in that pressure losses can be reduced by avoiding sharp bends or intersections, and is enabled by the positioning of valves 115 around the circumference of the tank 112 as aforesaid.

Figure 4:
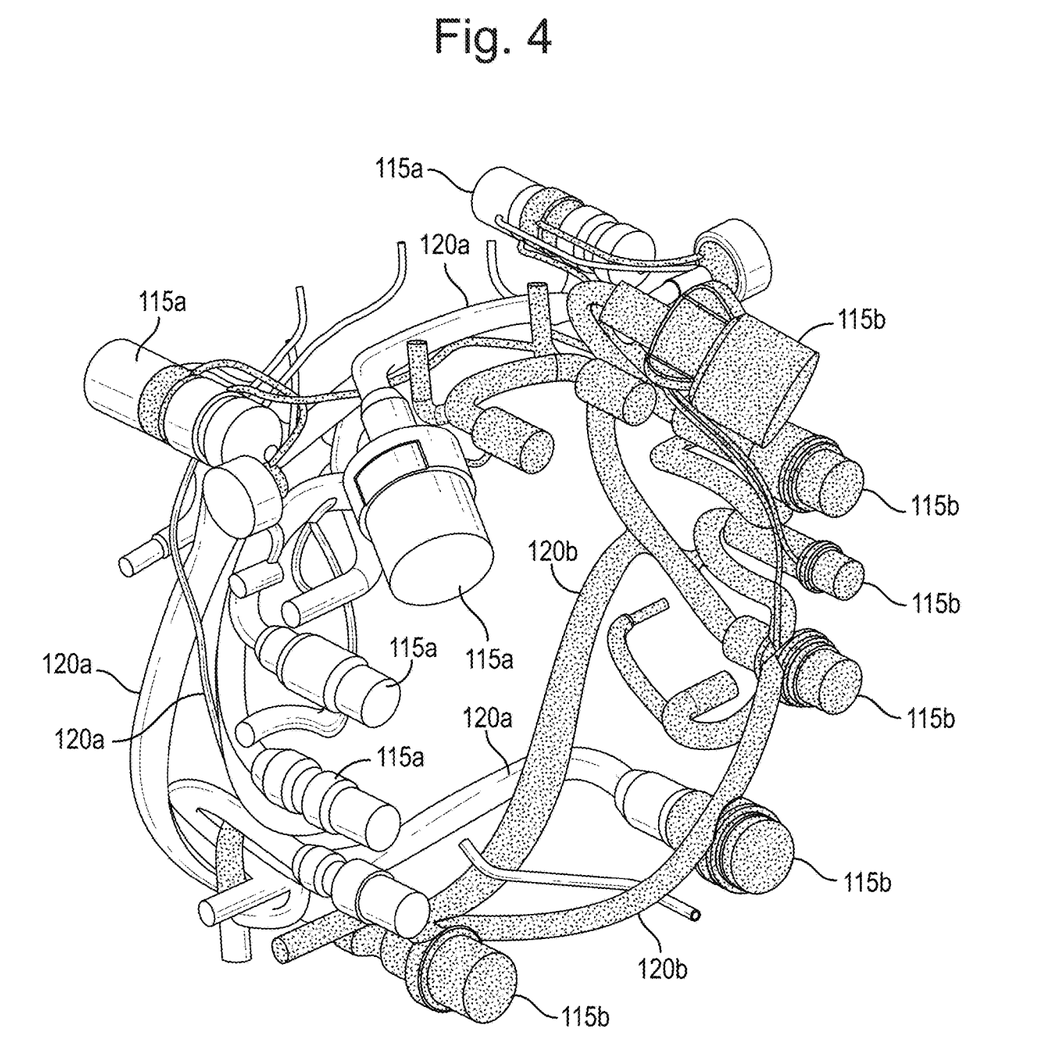
FIG. 4 shows the fluid passages of the control module of FIG. 3 in isolation with the valves.

FIG. 4 shows the fluid passages 120a, 120b of the control module 100 in isolation with the valves 115a, 115b. As is evident at least some (e.g., a majority) of the fluid passages 120a, 120b extend in a circumferential direction relative to a longitudinal axis of the tank 112, which would be positioned within the valves 115a, 115b as shown in, e.g., FIGS. 2A, 2B and 3.

FIG. 4 also indicates the different types of fluid passages and valves, namely pressurised or supply valves 115a and associated fluid passages 120a, as well as return valves 115b and associated fluid passages 120b. The supply valves 115a and associated passages 120a may be configured to supply pressurised hydraulic fluid to suitable parts of the hydraulic system, for example to actuate one or more components. The components may comprise one or more aircraft (e.g., helicopter) components such as landing gear, flight control surfaces, actuators, e.g., for rotors such as a main rotor and/or tail rotor (e.g., for a helicopter), and the like.

The return valves 115b and associated passages 120b may be configured to receive hydraulic fluid from the hydraulic system, for example from one or more components. The fluid received from the return valves 115b may firstly go to the tank 112, after which it may be pressurised by one or more pumps (not shown) and then supplied back to the supply valves 115a and associated passages 120a (under pressure) for forwarding on to one or more components as aforesaid.

One more pumps (not shown) may be provided, e.g., as part of the manifold, which may be configured to pressurise and/or distribute the fluid through the supply valves 115a and associated passages 120a.

Figure 5:
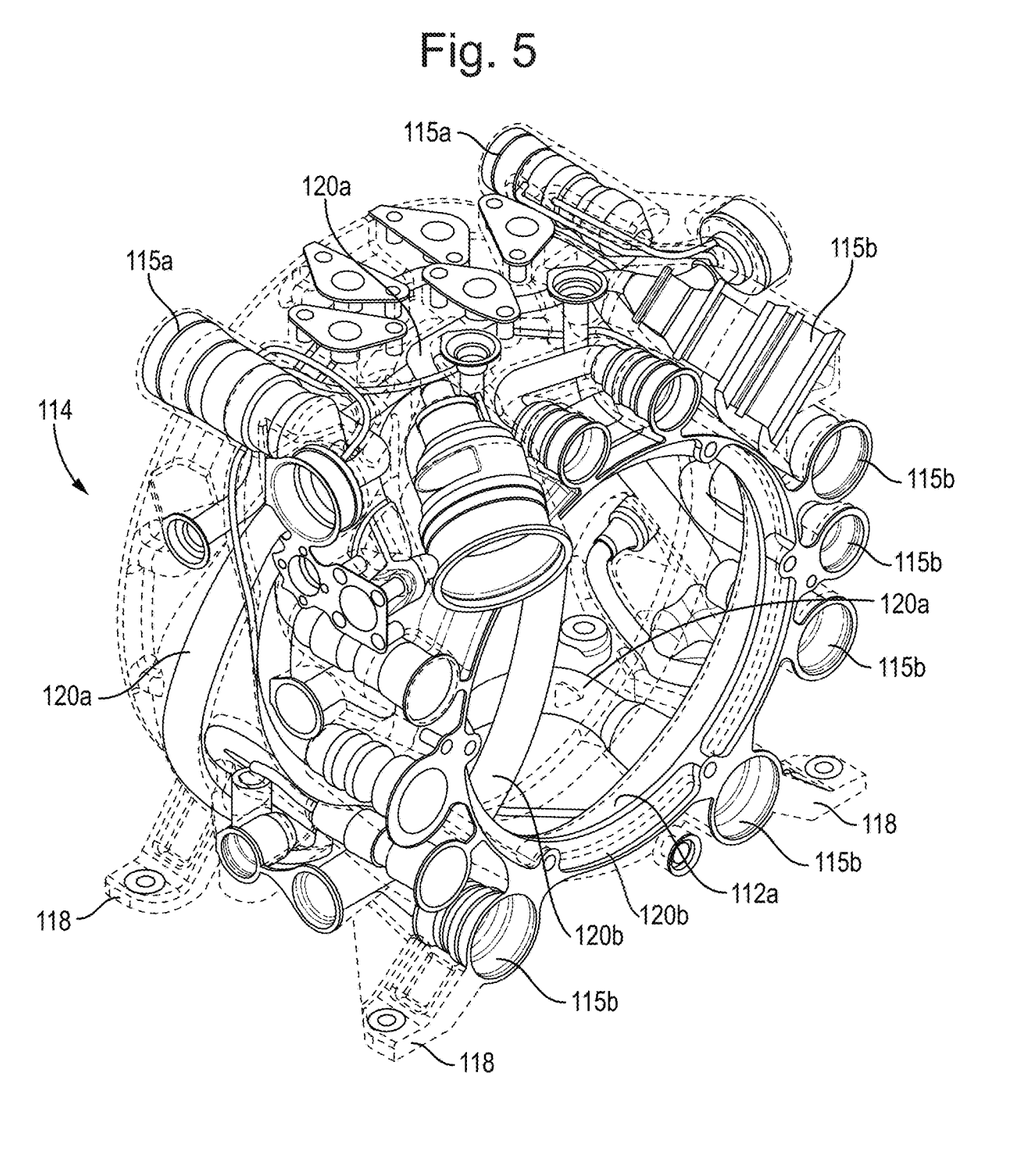
FIG. 5 shows the fluid passages and valves of the FIG. 3 embodiments in combination with the remainder of the housing.

FIG. 5 shows the fluid passages 120a, 120b and valves 115a, 115b in combination with the remainder of the housing 114, to illustrate how they are distributed within the control module 100. As will be appreciated, the tank 112 is formed in part by an inner, substantially cylindrical surface 112a of the housing 114, and at least some (e.g. a majority) of the various passages 120a, 120b extend circumferentially around the cylindrical surface 112a forming part of the tank 112. As noted above, this optimises the performance of the control module 100 by reducing pressure losses within the passages 120a, 120b between the various valves 115a, 115b caused by, e.g., sharp bends or intersections.

In addition, it can be seen that the feet 118 of the housing 114 and control module 100 are distributed at either axial end of the housing 114 (and tank 112), which enhances the stability of the control module 100 by placing its centre of gravity between the feet 118 in contrast with conventional arrangements.

Although the present disclosure has been described with reference to various embodiments, it will be understood by those skilled in the art that various changes in form and detail may be made without departing from the scope of the invention as set forth in the accompanying claims.

The invention claimed is:

1. A control module for a hydraulic system, the module comprising:
   a cylindrical tank configured to store hydraulic fluid;
   a plurality of valves fluidly connected to the tank and configured to control distribution of hydraulic fluid from the tank to one or more components of the system, wherein the plurality of valves are spaced around a circumference of the tank;
   one or more passages fluidly connecting the tank with at least one of the plurality of valves and/or a first of the plurality of valves with a second of the plurality of valves; and
   a plurality of feet configured to attach the control module to a surface; and
   a housing, wherein at least some of the plurality of valves are formed by portions of the housing.

2. A control module as claimed in claim 1, wherein the plurality of feet are positioned such that a centre of gravity of the control module is located between the feet when the control module is attached to a surface.

3. A control module as claimed in claim 2, wherein the plurality of feet are positioned such that a centre of gravity of the control module is located substantially half-way along a length and width of the control module, when the control module is attached to a surface.

4. A control module as claimed in claim 1, wherein the one or more passages are formed by and within the housing.

5. A control module as claimed in claim 1, wherein the housing comprises an inner cylindrical surface forming part of the tank.

6. A control module as claimed in claim 1, wherein the housing is a single piece of material.

7. A control module as claimed in claim 1, wherein the housing is formed using an additive manufacturing process.

8. A control module as claimed in claim 1, wherein the plurality of valves comprise one or more supply valves configured to supply pressurised hydraulic fluid to one or more components of the hydraulic system.

9. A control module as claimed in claim 1, wherein the plurality of valves comprise one or more return valves configured to receive hydraulic fluid from one or more components of the hydraulic system.

10. A hydraulic system comprising:
    a control module as claimed in claim 1,
    wherein the control module is configured to supply pressurised hydraulic fluid to one or more components of the hydraulic system.

11. A hydraulic system as claimed in claim 10, wherein the system is for an aircraft and the components are aircraft components, such that the control module is configured to supply pressurised hydraulic fluid so as to control and/or actuate the aircraft components.

12. An aircraft comprising:
    a hydraulic system as claimed in claim 10,
    wherein the components are aircraft components;
    wherein the control module is configured to supply pressurised hydraulic fluid so as to control or actuate the aircraft components.

* * * * *